United States Patent
Natili et al.

(10) Patent No.: US 8,547,673 B2
(45) Date of Patent: Oct. 1, 2013

(54) ELECTRICAL SWITCHING APPARATUS WITH OVERVOLTAGE PROTECTION

(75) Inventors: Thomas E. Natili, Penn Township, PA (US); David W. Stiffler, Burgettstown, PA (US); Joshua P. Mattocks, Aliquippa, PA (US)

(73) Assignee: Eaton Corporation, Cleveland, OH (US)

( * ) Notice: Subject to any disclaimer, the term of this patent is extended or adjusted under 35 U.S.C. 154(b) by 55 days.

(21) Appl. No.: 13/307,171

(22) Filed: Nov. 30, 2011

(65) Prior Publication Data

US 2013/0135781 A1    May 30, 2013

(51) Int. Cl.
*H02H 3/00* (2006.01)
(52) U.S. Cl.
USPC .......................... 361/91.1; 361/42
(58) Field of Classification Search
USPC .................................. 361/42, 91.1
See application file for complete search history.

(56) References Cited

U.S. PATENT DOCUMENTS

| | | | |
|---|---|---|---|
| 4,168,514 A | | 9/1979 | Howell |
| 4,216,515 A | * | 8/1980 | Van Zeeland ............... 361/45 |
| 4,659,161 A | * | 4/1987 | Holcomb .................. 439/490 |
| 5,224,006 A | | 6/1993 | MacKenzie et al. |
| 5,260,676 A | | 11/1993 | Patel et al. |
| 5,293,522 A | | 3/1994 | Fello et al. |
| 5,321,574 A | | 6/1994 | Patrick et al. |
| 5,459,630 A | | 10/1995 | MacKenzie et al. |
| 5,519,368 A | | 5/1996 | Heise et al. |
| 5,541,800 A | | 7/1996 | Misencik |
| 5,691,869 A | | 11/1997 | Engel et al. |
| 5,875,087 A | | 2/1999 | Spencer et al. |
| 5,917,686 A | | 6/1999 | Chan et al. |
| 6,057,997 A | | 5/2000 | Mackenzie et al. |
| 6,141,197 A | | 10/2000 | Kim et al. |
| 6,477,022 B1 | | 11/2002 | Ennis et al. |
| 6,552,884 B2 | | 4/2003 | Kim et al. |
| 6,577,478 B2 | | 6/2003 | Kim et al. |
| 6,671,150 B2 | | 12/2003 | Elms et al. |
| 6,724,591 B2 | | 4/2004 | Clarey et al. |
| 7,099,130 B2 | * | 8/2006 | Angle et al. ................ 361/44 |
| 7,633,728 B2 | | 12/2009 | Parker et al. |
| 2012/0147509 A1 | * | 6/2012 | Mechanic et al. ............ 361/49 |

OTHER PUBLICATIONS

World Products Inc., "Thermally Protected Varistors", Fuse Configuration and Dimensions, Rev. 9.1, Protection Products Catalog, Mar. 2008, p. 129.

* cited by examiner

*Primary Examiner* — Danny Nguyen
(74) *Attorney, Agent, or Firm* — Eckert Seamans Cherin & Mellott, LLC; Kirk D. Houser

(57) ABSTRACT

An electrical switching apparatus includes a first terminal, a second terminal, a neutral conductor, separable contacts electrically connected between the terminals, an operating mechanism to open and close the contacts, a fused varistor electrically connected between the first terminal and the neutral conductor; and a trip mechanism including a trip coil cooperating with the operating mechanism to trip open the contacts. A second varistor is electrically connected in series with the trip coil between the first terminal and the neutral conductor. A thyristor is electrically connected in parallel with the second varistor. An overvoltage detection circuit is electrically interconnected with and causes the thyristor to energize the trip coil and cause the trip mechanism to trip open the contacts responsive to overvoltage between the first terminal and the neutral conductor.

13 Claims, 1 Drawing Sheet

ELECTRICAL SWITCHING APPARATUS WITH OVERVOLTAGE PROTECTION

BACKGROUND

1. Field

The disclosed concept pertains to electrical switching apparatus and, more particularly, to circuit breakers, such as, for example, circuit breakers including overvoltage and surge protection.

2. Background Information

Circuit breakers are generally old and well known in the art. Circuit breakers are used to protect electrical circuitry from damage due to an overcurrent condition, such as an overload condition or a relatively high level short circuit or fault condition. In small circuit breakers, commonly referred to as miniature circuit breakers, used for residential and light commercial applications, such protection is typically provided by a thermal-magnetic trip device. This trip device includes a bimetal, which heats and bends in response to a persistent overcurrent condition. The bimetal, in turn, unlatches a spring powered operating mechanism, which opens the separable contacts of the circuit breaker to interrupt current flow in the protected power system.

When an overvoltage occurs (e.g., without limitation, due to downed power lines; due to loss of a neutral connection at the line side of a residential panelboard or load center), a surge device, which provides protection for the panelboard or load center and to downstream connected electrical loads, can and will pass elevated voltages to those devices.

Metal oxide varistors (MOVs) are electrically connected line-to-neutral in miniature arc fault circuit interrupter (AFCI) and/or ground fault circuit interrupter (GFCI) circuit breakers having, for example, one or two poles.

For example, U.S. Pat. No. 5,293,522 discloses a trip circuit for a single-pole circuit breaker including a line-to-neutral varistor, and a varistor for a trip circuit silicon controlled rectifier (SCR).

U.S. Pat. No. 5,260,676 discloses a trip circuit for a two-pole circuit breaker including two line-to-neutral varistors, and a varistor for a trip circuit SCR.

It is known to employ a MOV in parallel with a trip circuit SCR and in series with a solenoid trip coil in the trip circuit of AFCI and/or GFCI circuit breakers, and a MOV between the load and neutral terminals of such breakers.

U.S. Pat. No. 5,519,368 discloses a ground fault circuit including a coil assembly, a rectifier, a MOV and an SCR in parallel with the MOV.

If the neutral is "lost" (e.g., without limitation, due to an electrical problem; due to a "white" neutral conductor being disconnected from the power bus) in a single-pole, two-pole or three-phase power system, then the line-to-neutral voltage may rise to 208 or 240 $V_{RMS}$, thereby causing the line-to-neutral MOV(s) in a circuit breaker to fail (i.e., due to an excessive voltage condition of sufficient duration).

U.S. Pat. No. 4,168,514 discloses that as an added measure of fail-safe protection, a varistor is packaged in a thermally coupled relation with a thermal element, typically a bi-metal, of a trip unit. Thus, the heat generated in the varistor by the flow of abnormal leakage current therethrough will also indirectly heat the thermal element, contributing to the thermal tripping of a circuit breaker pursuant to removing the failing varistor from the circuit.

U.S. Pat. No. 5,321,574 discloses that responsive to a threshold of current passing through a MOV, this causes a magnetic trip circuit to trip a circuit breaker before a thermal trip circuit has had an opportunity to trip. The heat transfer from the MOV to the thermal trip circuit of the circuit breaker will not by itself cause thermal tripping. During failure transition of the MOV, the circuit is cleared by the much more rapid magnetic tripping of the circuit breaker, which by itself provides suitable circuit protection.

There is room for improvement in electrical switching apparatus, such as circuit breakers with surge protection.

SUMMARY

These needs and others are met by embodiments of the disclosed concept, which alleviate the passage of an elevated voltage to a number of loads downstream of a circuit breaker by tripping the circuit breaker during the disturbance, thereby saving the number of loads from a possible damaging overvoltage event. After the overvoltage event is over, the circuit breaker can be reset for continued operation with continued overvoltage protection.

In accordance with aspects of the disclosed concept, an electrical switching apparatus comprises: a first terminal; a second terminal; a neutral conductor; separable contacts electrically connected between the first terminal and the second terminal; an operating mechanism structured to open and close the separable contacts; a first fused varistor electrically connected between the first terminal and the neutral conductor; a trip mechanism cooperating with the operating mechanism to trip open the separable contacts, the trip mechanism comprising a trip coil; a second varistor electrically connected in series with the trip coil between the first terminal and the neutral conductor; a thyristor electrically connected in parallel with the second varistor; and an overvoltage detection circuit electrically interconnected with the thyristor, the overvoltage detection circuit being structured to cause the thyristor to energize the trip coil and cause the trip mechanism to trip open the separable contacts responsive to overvoltage between the first terminal and the neutral conductor.

The trip mechanism may comprise an indicator circuit cooperating with the first fused varistor to indicate normal operation of the first fused varistor.

The first fused varistor may comprise a fuse electrically conducted in series with a varistor between the first terminal and the neutral conductor; and an overvoltage may exist between the first terminal and the neutral conductor.

The operating mechanism may be structured to be reset after the trip mechanism trips open the separable contacts, in order to re-close the separable contacts; the first fused varistor may comprise a fuse electrically conducted in series with a varistor between the first terminal and the neutral conductor; and the trip mechanism may comprise an indicator circuit cooperating with the fuse of the first fused varistor to indicate either normal operation or failure of the first fused varistor.

For a subsequent overvoltage between the first terminal and the neutral conductor prior to the failure of the first fused varistor and prior to failure of the second varistor, the overvoltage detection circuit may be structured to respond to an overvoltage between the first terminal and the neutral conductor, energize the trip coil and cause the trip mechanism to trip open the separable contacts.

The first fused varistor may comprise a fuse electrically conducted in series with a varistor between the first terminal and the neutral conductor; the first fused varistor may be structured to provide surge protection and an indication of normal operation when the fuse is not open; the second varistor may be structured to provide surge protection between the first terminal and the neutral conductor; and the thyristor may be structured to respond to an overvoltage between the first terminal and the neutral conductor, energize the trip coil and cause the trip mechanism to trip open the separable contacts when a voltage between the first terminal and the neutral conductor reaches a predetermined value.

BRIEF DESCRIPTION OF THE DRAWINGS

A full understanding of the disclosed concept can be gained from the following description of the preferred embodiments when read in conjunction with the accompanying drawings in which.

DESCRIPTION OF THE PREFERRED EMBODIMENTS

As employed herein, the term "number" shall mean one or an integer greater than one (i.e., a plurality).

As employed herein, the statement that two or more parts are "connected" or "coupled" together shall mean that the parts are joined together either directly or joined through one or more intermediate parts. Further, as employed herein, the statement that two or more parts are "attached" shall mean that the parts are joined together directly.

The disclosed concept is described in association with a two-pole surge device and circuit interrupter, although the disclosed concept is applicable to a wide range of electrical switching apparatus having any number of poles or phases.

Figure 1:
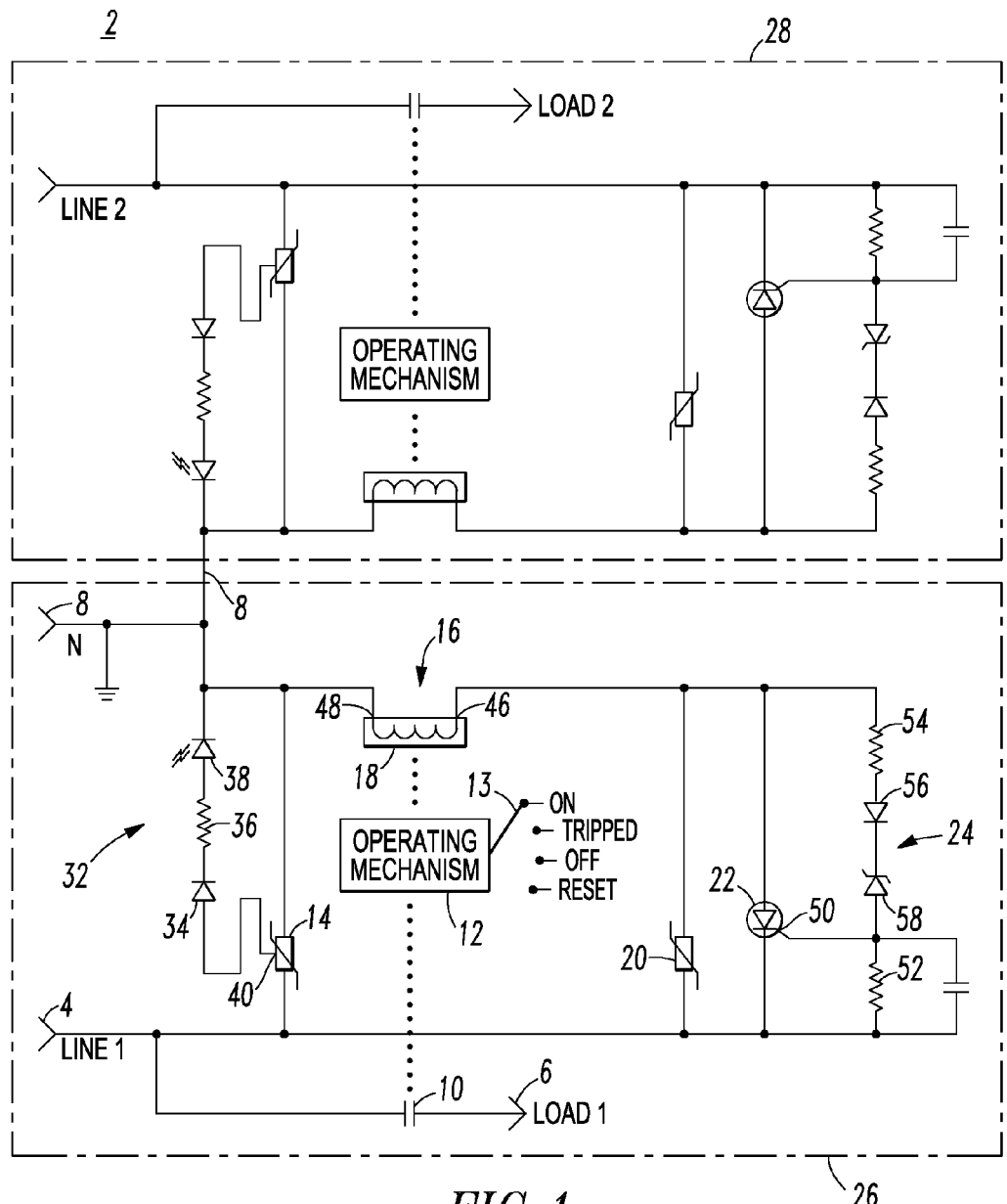
FIG. 1 is a block diagram in schematic form of an electrical switching apparatus in accordance with embodiments of the disclosed concept.

Referring to FIG. 1, an electrical switching apparatus, such as the example two-pole circuit interrupter 2, includes a first terminal (LINE 1) 4, a second terminal (LOAD 1) 6, a neutral conductor (N) 8, separable contacts 10 electrically connected between the first terminal 4 and the second terminal 6, and an operating mechanism 12 structured to open and close the separable contacts 10. A first fused varistor, such as the example MOV 14, is electrically connected between the first terminal 4 and the neutral conductor 8. A trip mechanism 16 cooperates with the operating mechanism 12 to trip open the separable contacts 10 and includes a trip coil 18. A second varistor, such as the example MOV 20, is electrically connected in series with the trip coil 18 between the first terminal 4 and the neutral conductor 8. A thyristor, such as the example SCR 22, is electrically connected in parallel with the MOV 20. An overvoltage detection circuit 24 is electrically interconnected with the SCR 22 and is structured to cause the SCR 22 to energize the trip coil 18 and cause the trip mechanism 16 to trip open the separable contacts 10 responsive to overvoltage between the first terminal 4 and the neutral conductor 8 prior to failure of the MOV 14 and/or the MOV 20.

Although a two-pole circuit interrupter 2 is shown, the disclosed concept is applicable to a single-pole circuit interrupter, such as a single-pole circuit breaker, as shown with a first pole 26 of the example two-pole circuit interrupter 2. The second pole 28 of the example two-pole circuit interrupter 2 is essentially identical to the example first pole 26, and both poles 26,28 share the same neutral conductor 8.

The trip mechanism 16 includes an indicator circuit 32 cooperating with the MOV 14 to indicate normal operation thereof. The example indicator circuit 32 includes the series combination of a diode 34, a resistor 36, and a light emitting diode (LED) 38 electrically connected between an indicator terminal 40 of the MOV 14 and the neutral conductor 8.

Figure 2:
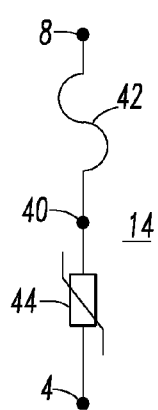
FIG. 2 is a block diagram in schematic form of the fused MOV of FIG. 1.

As shown in FIG. 2, the MOV 14 includes a fuse 42 electrically conducted in series with a varistor 44 between the first terminal 4 and the neutral conductor 8. When an overvoltage exists between the first terminal 4 and the neutral conductor 8, the overvoltage detection circuit 24 (FIG. 1) begins to conduct current, as will be described. The indicator circuit 32 (FIG. 1) cooperates with the MOV fuse 42 to indicate on the LED 38 either normal operation (LED lit) or failure (LED extinguished) of the MOV 14. When an overvoltage happens and the overvoltage detection circuit 24 is not functioning or the varistor 44 heats up due to surge events, the fuse 42 will open and remove the MOV 14 from the circuit. The terminal 40 passes voltage from one of the other two pins of the MOV 14 (from the first terminal 4) when the fuse 42 is not open. The terminal 40 is where the fuse 42 is series electrically connected with the varistor 44.

Continuing to refer to FIG. 1, the trip coil 18 includes a first node 46 and a second node 48 electrically connected to the neutral conductor 8. The SCR 22 includes a gate 50. The overvoltage detection circuit 24 includes a resistor 52 electrically connected between the first terminal 4 and the SCR gate 50, and a series combination of a resistor 54, a diode 56 and a zener diode 58 electrically connected between the SCR gate 50 and the trip coil first node 46.

Current flowing through the series combination of the resistor 54, the diode 56 and the zener diode 58 actuates the SCR gate 50 to cause the SCR 22 to energize the trip coil 18 and cause the trip mechanism 16 to trip open the separable contacts 10 at a predetermined voltage value prior to opening of the MOV 14 and/or the MOV 20.

As is conventional, the operating mechanism 12 is optionally structured to be reset (e.g., without limitation, by operating handle 13 moving from a TRIPPED position through an OFF position to a RESET position and back to an ON position) after the trip mechanism 16 trips open the separable contacts 10, in order to re-close the separable contacts 10.

The MOV 14 is structured to provide an indication from terminal 40 of normal operation when the MOV fuse 42 is not open. The SCR 22 is structured to respond to an overvoltage between the first terminal 4 and the neutral conductor 8, energize the trip coil 18 and cause the trip mechanism 16 to trip open the separable contacts 10 when the overvoltage detection circuit 24 reaches the predetermined voltage value.

In a conventional circuit interrupter with a surge device, when an overvoltage condition would exist on LINE 1, between a first terminal and a neutral conductor, a fused MOV begins to conduct current until the fuse integral thereto is opened. The disclosed concept seeks to eliminate this condition. For example and without limitation, prior to the fuse 42 opening, the example 240V zener diode 58 begins to conduct current supplied by resistor 54. This value is selected to ensure that the zener diode 58 stays in conduction during the overvoltage condition. Resistor 52 and capacitor 53 ensure zener diode 58 does not conduct enough current to trip during relatively short fluctuations of the LINE 1 voltage. The current from the zener diode 58 is then driven into the SCR gate 50. The SCR 22, in turn, activates a trip solenoid (not shown) of the trip mechanism 16 through the trip coil 18 to trip open the circuit breaker 2. Upon reset of the circuit breaker 2 by the operating mechanism 12, as was described, if the LED 38 is extinguished due to the MOV fuse 42 being open, thereby alerting the user that the circuit breaker 2 and MOVs 14 and 20 have seen an overvoltage fault or have exhausted the surge protection of the MOVs 14 and 20. If the circuit breaker 2 is resettable by the operating mechanism 12 and the LED 38 is lit, then for any subsequent overvoltage events, the circuit breaker 2 will trip and protect connected loads (not shown) due to MOV 14 and the overvoltage detection circuit 24 being intact.

The disclosed concept employs a first varistor, such as the example fused MOV 14, to provide an indication of normal operation when the fuse 42 thereof is not open; a thyristor, such as the example SCR 22, to trip the circuit breaker 2 through the trip coil 18 when the overvoltage detection circuit 24 reaches its predetermined voltage value. Although not shown in FIG. 1, the second MOV 20 is a fused MOV and may optionally employ an indicator circuit (not shown) similar to the indicator circuit 32.

The disclosed concept as shown with the example first pole 26 is portable to other phases or poles, such as the example second pole 28. For example and without limitation, it is also applicable to a plural-phase, a three-phase or a single-phase circuit interrupter.

The disclosed concept is applicable to loss of neutral protection. For example and without limitation, the voltage between the first terminal (LINE 1) 4 and the neutral conductor (N) 8 is normally 120 $V_{RMS}$, but during a loss of neutral, one phase (e.g., either LINE 1 or LINE 2) may increase up to 240 $V_{RMS}$.

While specific embodiments of the disclosed concept have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the disclosed concept which is to be given the full breadth of the claims appended and any and all equivalents thereof.

What is claimed is:

1. An electrical switching apparatus comprising:
   a first terminal;
   a second terminal;
   a neutral conductor;
   separable contacts electrically connected between said first terminal and said second terminal;
   an operating mechanism structured to open and close said separable contacts;
   a first fused varistor electrically connected between said first terminal and said neutral conductor;
   a trip mechanism cooperating with said operating mechanism to trip open said separable contacts, said trip mechanism comprising a trip coil;
   a second varistor electrically connected in series with the trip coil between said first terminal and said neutral conductor;
   a thyristor electrically connected in parallel with said second varistor; and
   an overvoltage detection circuit electrically interconnected with said thyristor, said overvoltage detection circuit being structured to cause said thyristor to energize said trip coil and cause said trip mechanism to trip open said separable contacts responsive to overvoltage between said first terminal and said neutral conductor,
   wherein said first fused varistor comprises a fuse electrically connected in series with a varistor between said first terminal and said neutral conductor; wherein an overvoltage exists between said first terminal and said neutral conductor;
   wherein prior to said fuse being opened, said overvoltage detection circuit begins to conduct current;
   wherein said trip coil comprises a first node and a second node electrically connected to said neutral conductor; wherein said thyristor comprises a gate; and wherein said overvoltage detection circuit comprises a first resistor electrically connected between said first terminal and said gate, and a series combination of a resistor, a diode and a zener diode electrically connected between said gate and the first node of said trip coil.

2. The electrical switching apparatus of claim 1 wherein said trip mechanism comprises an indicator circuit cooperating with said first fused varistor to indicate normal operation of said first fused varistor.

3. The electrical switching apparatus of claim 1 wherein current flowing through the series combination actuates the gate of said thyristor to cause said thyristor to energize said trip coil and cause said trip mechanism to trip open said separable contacts.

4. The electrical switching apparatus of claim 1 wherein said electrical switching apparatus is a circuit interrupter.

5. An electrical switching apparatus comprising:
   a first terminal;
   a second terminal;
   a neutral conductor;
   separable contacts electrically connected between said first terminal and said second terminal;
   an operating mechanism structured to open and close said separable contacts;
   a first fused varistor electrically connected between said first terminal and said neutral conductor;
   a trip mechanism cooperating with said operating mechanism to trip open said separable contacts, said trip mechanism comprising a trip coil;
   a second varistor electrically connected in series with the trip coil between said first terminal and said neutral conductor;
   a thyristor electrically connected in parallel with said second varistor; and
   an overvoltage detection circuit electrically interconnected with said thyristor, said overvoltage detection circuit being structured to cause said thyristor to energize said trip coil and cause said trip mechanism to trip open said separable contacts responsive to overvoltage between said first terminal and said neutral conductor,
   wherein said operating mechanism is structured to be reset after said trip mechanism trips open said separable contacts, in order to re-close said separable contacts; wherein said first fused varistor comprises a fuse electrically connected in series with a varistor between said first terminal and said neutral conductor; and wherein said trip mechanism comprises an indicator circuit cooperating with the fuse of said first fused varistor to indicate either normal operation or failure of said first fused varistor.

6. The electrical switching apparatus of claim 5 wherein an overvoltage exists between said first terminal and said neutral conductor.

7. The electrical switching apparatus of claim 6 wherein prior to said fuse being opened, said overvoltage detection circuit begins to conduct current.

8. The electrical switching apparatus of claim 5 wherein for a subsequent overvoltage between said first terminal and said neutral conductor prior to said failure of said first fused varistor and prior to failure of said second varistor, the overvoltage detection circuit is structured to respond to an overvoltage between said first terminal and said neutral conductor, energize said trip coil and cause said trip mechanism to trip open said separable contacts.

9. An electrical switching apparatus comprising:
   a first terminal;
   a second terminal;
   a neutral conductor;
   separable contacts electrically connected between said first terminal and said second terminal;

an operating mechanism structured to open and close said separable contacts;

a first fused varistor electrically connected between said first terminal and said neutral conductor;

a trip mechanism cooperating with said operating mechanism to trip open said separable contacts, said trip mechanism comprising a trip coil;

a second varistor electrically connected in series with the trip coil between said first terminal and said neutral conductor;

a thyristor electrically connected in parallel with said second varistor; and an overvoltage detection circuit electrically interconnected with said thyristor, said overvoltage detection circuit being structured to cause said thyristor to energize said trip coil and cause said trip mechanism to trip open said separable contacts responsive to overvoltage between said first terminal and said neutral conductor, wherein said first fused varistor comprises a fuse electrically connected in series with a varistor between said first terminal and said neutral conductor; wherein said first fused varistor is structured to provide surge protection and an indication of normal operation when the fuse is not open; wherein said second varistor is structured to provide surge protection between said first terminal and said neutral conductor; and wherein said thyristor is structured to respond to an overvoltage between said first terminal and said neutral conductor, energize said trip coil and cause said trip mechanism to trip open said separable contacts when a voltage between said first terminal and said neutral conductor reaches a predetermined value.

10. The electrical switching apparatus of claim 9 wherein said first fused varistor is a fused MOV.

11. An electrical switching apparatus comprising:
a first terminal;
a second terminal;
a neutral conductor;
separable contacts electrically connected between said first terminal and said second terminal;
an operating mechanism structured to open and close said separable contacts;
a first fused varistor electrically connected between said first terminal and said neutral conductor;
a trip mechanism cooperating with said operating mechanism to trip open said separable contacts, said trip mechanism comprising a trip coil;
a second varistor electrically connected in series with the trip coil between said first terminal and said neutral conductor;
a thyristor electrically connected in parallel with said second varistor; and
an overvoltage detection circuit electrically interconnected with said thyristor, said overvoltage detection circuit being structured to cause said thyristor to energize said trip coil and cause said trip mechanism to trip open said separable contacts responsive to overvoltage between said first terminal and said neutral conductor,
wherein said first fused varistor is a fused MOV,
wherein the fused MOV comprises a series combination of a fuse and an MOV, and a terminal electrically interconnected to both of said fuse and said MOV; and wherein said trip mechanism comprises an indicator circuit cooperating with the last said terminal to indicate normal operation of said fused MOV.

12. The electrical switching apparatus of claim 11 wherein said electrical switching apparatus is a single-pole circuit breaker.

13. An electrical switching apparatus comprising:
a first terminal;
a second terminal;
a neutral conductor;
separable contacts electrically connected between said first terminal and said second terminal;
an operating mechanism structured to open and close said separable contacts;
a first fused varistor electrically connected between said first terminal and said neutral conductor;
a trip mechanism cooperating with said operating mechanism to trip open said separable contacts, said trip mechanism comprising a trip coil;
a second varistor electrically connected in series with the trip coil between said first terminal and said neutral conductor;
a thyristor electrically connected in parallel with said second varistor; and
an overvoltage detection circuit electrically interconnected with said thyristor, said overvoltage detection circuit being structured to cause said thyristor to energize said trip coil and cause said trip mechanism to trip open said separable contacts responsive to overvoltage between said first terminal and said neutral conductor,
wherein said electrical switching apparatus is a two-pole circuit breaker; and wherein said first terminal, said second terminal, said separable contacts, said operating mechanism, said first fused varistor, said trip mechanism, said second varistor, said thyristor and said overvoltage detection circuit are operatively associated with one pole of said two-pole circuit breaker.

* * * * *